UNITED STATES PATENT OFFICE.

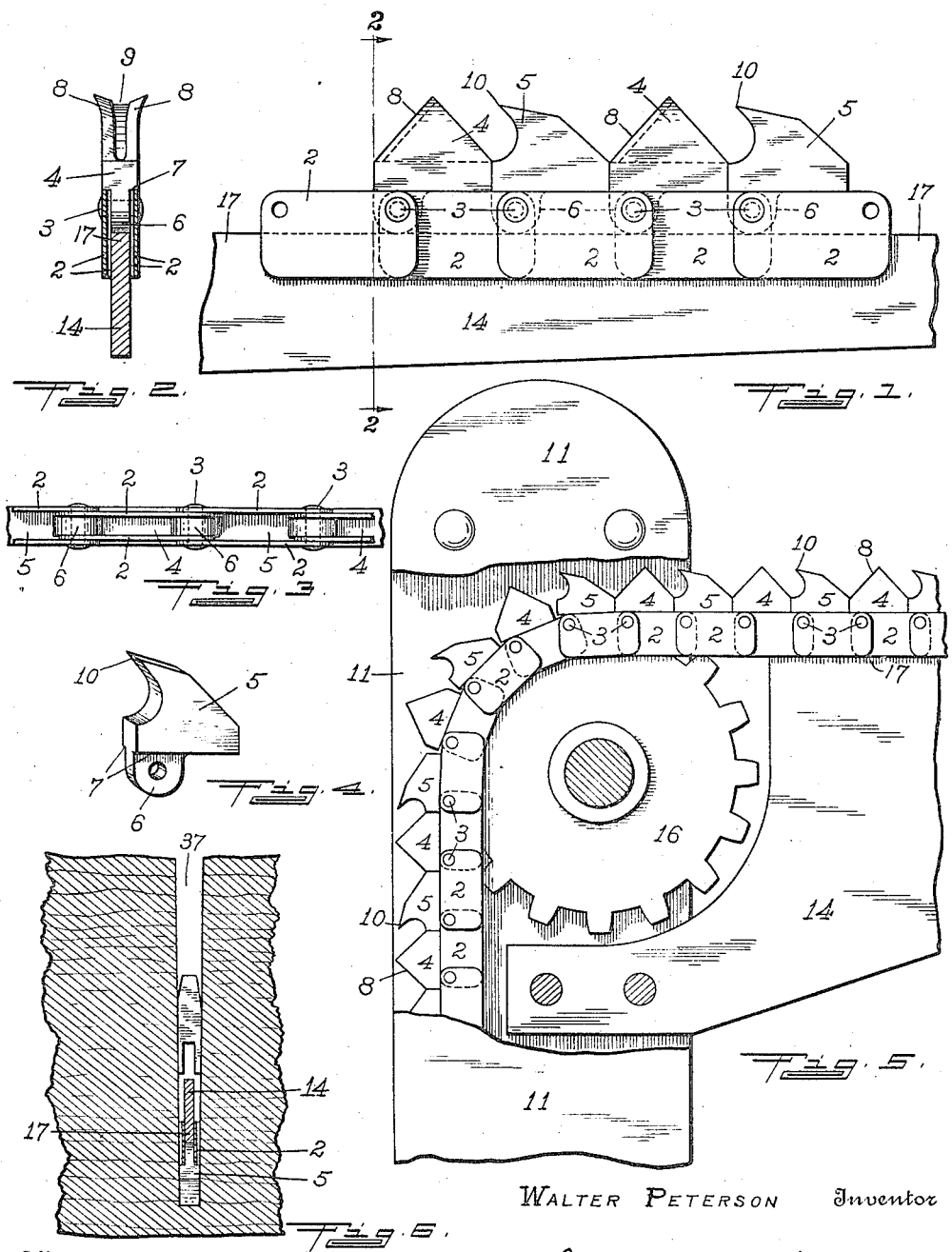

WALTER PETERSON, OF HONEY CREEK, IOWA.

CHAIN SAW.

1,231,190. Specification of Letters Patent. Patented June 26, 1917.

Application filed April 8, 1916. Serial No. 89,893.

*To all whom it may concern:*

Be it known that I, WALTER PETERSON, a citizen of the United States, residing at Honey Creek, in the county of Pottawattamie, in the State of Iowa, have invented certain new and useful Improvements in Chain Saws, and have described the same in the following specification, illustrated by the accompanying drawings.

My invention relates to that class of chain saws which are used for cutting down trees and sawing off logs, and which individually comprise an endless sprocket chain, provided with saw teeth. It is the object of the invention to simplify the construction and increase the efficiency of such saws; to adapt the same to be operated, driven and held up to their work in a superior manner; and in general to produce a superior saw of the specified class. To accomplish this result I incorporate in my improved chain saw, as parts thereof, a plurality of saw teeth which are formed independently of the sprocket chain, are pivoted thereto, and are adapted to engage the sprockets of the associated sprocket wheel immediately.

In said drawings, illustrating the best manner in which I have contemplated applying the principles of the invention, Figure 1 is a side elevation of a portion of a chain saw which is constructed in accordance with these principles, and a portion of a stationary guide on which it travels. Fig. 2 is a vertical cross section of the saw and the guide, on the section line 2—2 of Fig. 1. Fig. 3 is a plan of a portion of the same saw, disposed as in Fig. 1 and seen from below. Fig. 4 is a perspective view of one of the saw teeth. Fig. 5 is an incomplete side elevation of the same saw, associated with a sprocket wheel, a guide and a supporting frame. Fig. 6 is a longitudinal section of a log, partly cross-cut and having the chain saw, the guide and a wedge, in operative position in the saw kerf.

In the illustrated instance, my improved saw comprises a plurality of the double sheet links 2, duplicates of each other, which are severally united and collectively pivoted together in terminally over-lapping succession by the shafts 3. Each link has two spaced and duplicate parallel side plates, which are denoted by the same numeral 2. The saw further comprises a plurality of the cutting teeth 4 and of the routing teeth 5 alternating therewith. These teeth have the transversely perforated lugs 6, extending into the interior of the double links 2, and are pivoted by these lugs on the shafts 3 respectively, in such a manner as to be operatively brought into terminally abutting engagement with each other successively, as often as they assume the normal and rectilinear working position shown in Fig. 1. These lugs are positioned and adapted to admit and engage between them the sprockets of a driving sprocket wheel. Being thicker than the lugs, the teeth have on their opposite sides the shoulders 7, which are adapted to contact with the adjacent edges of the side plates 2 and thereby to stop the teeth from turning pivotally backward from the cutting position shown in Fig. 1, as well as from turning unduly forward when disengaged from the work. The cutting teeth 4 are centrally split at the point, and for a distance back from the point, as shown in Fig. 2; so that each of them has two separate and parallel cutting edges, or blades 8, spaced by the open longitudinal channel 9, and adapted to work in the opposite sides of the saw kerf 37 respectively; while each of the routing teeth 5 has a transverse cutting edge 10 directed forward. The guide 14, which is bolted to the frame 11 carrying the sprocket wheel 16, has the straight and thin margin 17 adapted by sliding engagement with the links 2, to guide the saw straight while holding the same unyieldingly forward to its work.

I claim as my invention—

1. An endless chain saw of the specified class, comprising a plurality of side plates, a plurality of shafts connecting the plates together in pairs and pivoting the pairs together in terminally overlapping succession, and a plurality of saw teeth having stop shoulders to engage the plates, and having lugs pivoted on the shafts and adapted to engage the teeth of a sprocket wheel.

2. An endless chain saw of the specified class, comprising a plurality of side plates, a plurality of shafts connecting the plates together in pairs and pivoting the pairs together in terminally overlapping succession, and a plurality of saw teeth having lugs pivoted on the shafts between the plates and adapted to engage the teeth of a sprocket wheel.

3. An endless chain saw of the specified class, comprising a plurality of double links having side plates, a plurality of shafts connecting the side plates and pivoting the links together in series, and a plurality of saw teeth pivoted on the shafts respectively.

4. An endless chain saw of the specified class, comprising a plurality of double links having side plates spaced apart and adapted to admit between the plates a link-guiding bar, a plurality of shafts connecting the side plates in pairs, and pivoting the links together in series, and a plurality of saw teeth, pivoted on the shafts respectively.

5. An endless chain saw of the specified class, comprising a plurality of double links having side plates spaced apart to admit a guide between them, a plurality of shafts connecting the side plates in pairs and pivoting the links together in terminally overlapping succession, and a plurality of saw teeth pivoted on the shafts respectively, and having stop shoulders adapted to engage by contact the edges of the plates.

6. An endless chain saw of the specified class, comprising a plurality of double links having side plates, a plurality of shafts connecting the side plates and pivoting the links together in series, and a plurality of normally abutting saw teeth pivoted on the shafts respectively, and adapted to engage the teeth of a sprocket wheel.

7. An endless chain saw of the specified class, comprising a plurality of double links having side plates, a plurality of shafts connecting the side plates and pivoting the links together in series, and a plurality of normally abutting saw teeth pivoted on the shafts respectively and having stop shoulders adapted to engage the plates.

8. An endless chain saw of the specified class, comprising a plurality of double links having side plates spaced apart to accommodate an interposed guide, a plurality of shafts connecting the side plates in pairs and pivoting the links together in series, and a plurality of normally abutting saw teeth pivoted on the shafts respectively.

9. An endless chain saw of the specified class, comprising a plurality of side plates spaced apart to accommodate an intermediate guide, a plurality of shafts connecting the plates together in pairs and pivoting the pairs together in series, and a plurality of normally abutting saw teeth having stop shoulders to engage the plates.

Witness my signature at Omaha, Nebraska, April 6, 1916.

WALTER PETERSON.